United States Patent [19]
Erickson et al.

[11] 3,745,816
[45] July 17, 1973

[54] ABLATION ARTICLE AND METHOD

[75] Inventors: Wayne D. Erickson, Hampton;
Edward M. Sullivan, Newport News, both of Va.

[73] Assignee: The United States of America as represented by the Administrator of the National Aeronautics and Space Administration, Washington, D.C.

[22] Filed: Sept. 20, 1971

[21] Appl. No.: 182,033

[52] U.S. Cl. .................. 73/86, 73/339, 73/432 R, 356/72
[51] Int. Cl. .................. G01n 17/00, G01n 19/06
[58] Field of Search .................. 73/7, 15.4, 86; 356/72

[56] References Cited
UNITED STATES PATENTS
3,513,692  5/1970  Slone .................................... 73/86
3,566,670  3/1971  Ridle .................................... 73/86
3,315,076  4/1967  Jordan ............................ 250/10 GT

*Primary Examiner*—S. Clement Swisher
*Attorney*—Howard J. Osborn, Wallace J. Nelson and John R. Manning

[57] ABSTRACT

An ablation article, such as a conical heat shield, having an ablating surface is provided with at least one discrete area of at least one seed material, such as aluminum. When subjected to ablation conditions, the seed material is ablated. Radiation emanating from the ablated seed material is detected to analyze ablation effects without disturbing the ablation surface. By providing different seed materials having different radiation characteristics, the ablating effects on various areas of the ablating surface can be analyzed under any prevailing ablation conditions. The ablating article can be provided with means for detecting the radiation characteristics of the ablated seed material to provide a self-contained analysis unit.

10 Claims, 1 Drawing Figure

PATENTED JUL 17 1973 3,745,816
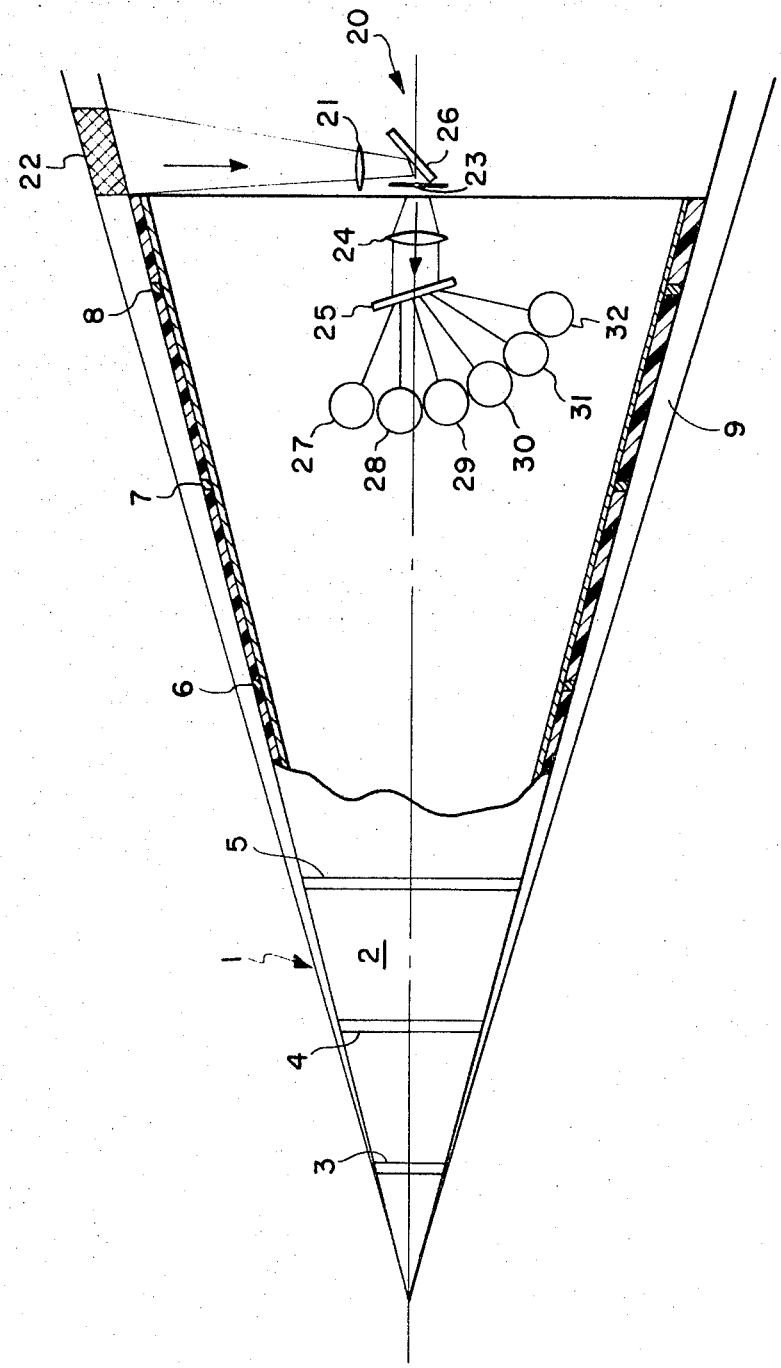
INVENTORS
WAYNE D. ERICKSON
EDWARD M. SULLIVAN
BY
Howard J. Osborn
Wallace J. Nelson
ATTORNEYS

ABLATION ARTICLE AND METHOD

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

The present invention relates to ablation articles having an ablating surface useful in analyzing ablation of that surface and to methods of analyzing the ablation thereof. In one aspect, the invention relates to such an article useful in detecting transition between laminar and turbulent flow in the boundary layer over the surface and to methods of detecting that transition.

While it is important to be able to predict boundary layer transition on non-ablative surfaces, such as the surfaces of spacecraft nose cones, it is even more important to be able to predict this transition on ablative surfaces in order to define the amount of ablation material required, since most ablation materials perform differently in laminar and turbulent flow. The problem of defining boundary layer flow transition is more difficult on an ablative surface, such as a spacecraft nose cone, because conventional devices such as calorimeters and thermocouples are not designed for ablative surfaces and the test results may be questionable. A calorimeter surface will, in general, move relative to an ablative surface, resulting in projections or cavities on the surface. Thermocouples present difficulties in obtaining reliable measurements because the material surrounding the thermocouple is an inhomogeneous gas-solid system with continuously changing properties.

Other experimental techniques for defining flow transition on an ablating surface have been proposed and are being investigated. They include sound pressure devices which sense changes in acoustic energy level in the boundary layer and vibration detectors which sense the response of either the ablator or the basic structure. Background noise level is a major problem with these devices.

It is an object of the present invention to provide ablation articles having ablation surfaces useful in analyzing ablation of those surfaces and to methods of analyzing ablation thereof which do not disturb the surface being ablated and which are therefore free of the disadvantages noted above. It is a further object of the invention to provide such articles and methods useful in the detection of transitions between laminar and turbulent flow in the boundary layer over an ablating surface.

BRIEF SUMMARY OF THE INVENTION

The foregoing and other objects which will be apparent to those having ordinary skill in the art are achieved according to the present invention by providing in an ablating surface of an ablation article, at least one discrete area of a seed material. The seed material employed is one which has one or more spectral lines of sufficient intensity to permit positive detection upon ablation of said surface and which has a spectral line signature distinct from that of said ablating surface during ablation thereof. Ablation of the surface is analyzed according to the invention by subjecting the surface to ablating conditions, and detecting radiation emanating from the seed material ablated from said surface.

DETAILED DESCRIPTION

There follows a detailed description of a preferred embodiment of the invention, together with accompanying drawings. However, it is to be understood that the detailed description and accompanying drawing are provided solely for the purpose of illustrating a preferred embodiment and that the invention is capable of numerous modifications and variations apparent to those skilled in the art without departing from the spirit and scope of the invention.

The single FIGURE of the drawing is a diagrammatic side elevation, partly in section, of an ablative nose cone and radiation detection system according to the present invention.

With reference to the drawing, there is shown a conical ablating heat shield generally designated by reference numeral 1 and having synthetic resin ablation surface 2 thereon. Ablation surface 2 is conventional and is fabricated from forty parts by weight polyamide, 25 parts by weight phenolic resin and 35 parts by weight of phenolic microballoons. To a separate portion of the resin formulation is added a small amount of finely divided aluminum particles in an amount of 0.1 atomic weight percent. To other separate portions of the resin are added, respectively, 0.1 atomic weight percent of finely divided particles of the metals bismuth, gold, lead, silver and tin. The resin formulation portions including these seed metal particles are located in the finished heat shield at discrete areas 3–8 of the ablating surface, each area being spaced longitudinally of the cone axis of the conical heat shield and each containing a different metal. In this example, the metals are disposed as follows: area 3 — aluminum; area 4 — bismuth; area 5 — gold; area 6 — lead; area 7 — silver; area 8 — tin. Each of seed areas 3–8 extend completely around heat shield 1 and through the full depth of ablation surface 2.

When subjected to ablating conditions, such as by exposure to a rapidly moving gas stream either in test apparatus or in passing through space, a boundary layer 9 develops adjacent the ablation surface 2 of the heat shield. When surface 2 ablates, seed material from areas 3–8 of surface 2 will also ablate and, in accordance with the present invention, radiation from the ablated seed material is detected to analyze ablation effects without disturbing the ablating surface.

A suitable radiation detection system is shown in the drawing and generally designated by reference numeral 20. In this instance, the radiation detection mounted within is heat shield 1 thus providing a self-contained unit useful in space applications. It will be clear that the detection system can be mounted elsewhere and, in test devices, it would ordinarily be preferable to mount the system separate from the article being tested. Detection system 20 includes a lens 21 for focussing an observed volume 22 of the boundary layer 9 in the wake of the heat shield and adjacent the rear edge thereof. Volume 22 will include radiating products of ablation including seed metals from each of areas 3-8 which are undergoing ablation. The focussed radiation is directed through aperture 23 and lens 24 onto transmission grating 25 by means of mirror 26. Grating 25 splits the incident beam into its component frequencies and the portions of the beam associated with the characteristic spectral lines are then focussed on individual photomultiplier detectors 27–32, one specific for each seed element. The output of each photomultiplier will be proportional to the intensity of radiation from the corresponding seed element. Each photomultiplier output then gives a measurement which is proportional to the heating rate at the location of the associated seeded area 3–8.

The system as shown in the drawing can be readily packaged inside a spacecraft in a fixed position to monitor the flow in one region of the base of the heat shield. The number of detector systems could be increased and the entire base region monitored continuously during the entire flight. An alternate scheme for increasing the coverage of radiation detection could be achieved by continuous rotation of mirror 26 and lens 21. This scheme would give a full 360° coverage of radiation and can be utilized to distinguish between various discrete areas of the ablating surface. The rotating mirror and lens would be covered by an optical grade quartz cap which would serve as a window and thermal protective system.

While the system just described can be used, inter alia, to determine the existence of ablation at a specific area of surface 2 or to provide a measure of the rate of ablation at that area, a particularly advantageous use of the invention is to detect transition between laminar and turbulent flow in boundary layer 9 and, even more advantageously, to make that determination for various areas of the ablating surface. As mentioned above, most ablation materials perform differently in laminar and turbulent flow. It is therefore important to be able to predict the transition on ablative materials in order to be able to predict the amount of ablation material required for a given application. This is particularly important in space applications where weight is a critical factor. The transition from laminar to turbulent flow is easily detected according to the present invention by an increase in characteristic radiation associated with the transition. For example, the aluminum radiation doublet at 3944A and 3961A is seen very distinctly against faint CN tail bands in a spectrogram of a nylon-phenolic model seeded with 0.1 atomic weight present aluminum and exposed to a heating rate of 736 Btu/f-$t^2$-sec.

The nature of the seed material can vary widely. It must, however, have one or more spectral lines of sufficient intensity to permit positive detection and it must have a spectral line signature different from that of the ablating material. Where a plurality of seeding materials are used in different areas of the ablating surface, each preferably has a spectral signature different from that of all other seed materials and, where the individual positions of the individual seed material areas on the surface are not otherwise discernible, such as by a rotating mirror and lens as described above, this difference is required in order to distinguish between the different seeded areas. Preferably, the spectral signatures of the seed materials are in the visible or near infrared for simplicity of transmission and detection with conventional optical devices. The seed materials should also be chemically inert with respect to the ablating material and used in small enough quantities to minimize the likelihood of any change in the ablation performance of the seeded portions of the ablator. The melting and vaporization temperatures of the seed elements should also be compatible with the pyrolysis and char removal temperatures of the ablation material. It will be apparent that the nature of the seed material can vary widely within the foregoing criteria for a given ablation material and a few metals useful with the nylon-phenolic ablator mentioned above are as follows:

| Element | Melting Point (°C) | Boiling Point (°C) | Vaporization Point (°C) |
| --- | --- | --- | --- |
| Aluminum | 660 | 2450 | 1927 |
| Bismuth | 271 | 1560 | 1520 |
| Gold | 1063 | 2970 | 2620 |
| Lead | 327 | 1725 | 1550 |
| Silver | 961 | 2210 | 1870 |
| Tin | 232 | 2270 | 2070 |

The amount of seed material can also vary widely and will in general be present in an amount sufficient to provide a readily detectable radiation signature under ablating conditions. This minimum amount will itself vary depending upon the ablating conditions. For example, in one system, radiation from an amount of 0.1 atomic weight percent aluminum is not readily discernible at a heating rate of 268 Btu/ft$^2$-sec. whereas it is readily discernible at a higher heating rate of 736 Btu/ft$^2$-sec. In general, it is considered that a minimum amount of 0.01 atomic weight percent will be suitable. The maximum amount of seed material is that which would substantially affect the ablation characteristics of the ablator. In tests run with aluminum, no appreciable change in recession of an ablated nose cone can be detected with aluminum in amounts up to 1.0 atomic weight percent at various heating rates. In general, it is preferable to use a minimum amount of material and, therefore, it is preferred not to exceed about two atomic weight percent.

What is claimed is:

1. In an ablation article having an ablating surface, the improvement comprising providing in at least one discrete circumferentially disposed exterior area of said surface, a seed material, said seed material being one which has one or more spectral lines of sufficient intensity to permit positive detection upon ablation of said surface and which has a spectral line signature distinct from that of said ablating surface during ablation thereof.

2. An improved ablation article according to claim 1 including at least two of said seed materials, each of said seed materials being located in a different area of said surface, and each having a spectral line signature different from each of the other seed materials.

3. An improved ablation article according to claim 1 wherein said article comprises a space vehicle heat shield.

4. An improved ablation article according to claim 3 wherein said heat shield includes means for detecting radiation emanating from said seed material ablated from said surface.

5. An improved ablation article according to claim 2 wherein said article comprises a space vehicle heat shield, said heat shield being conical in shape, said different areas being spaced longitudinally of the cone axis on the outer surface of said conical heat shield.

6. An improved ablation article according to claim 1 wherein said seed material comprises a metal selected from the group consisting of aluminum, bismuth, gold, lead, silver and tin.

7. A method of analyzing the ablation of an ablating surface comprising the steps of: providing an ablation article having an ablating surface, said surface including a seed material in a discrete circumferentially disposed exterior area thereof, said seed material being one which has one or more spectral lines of sufficient intensity to permit positive detection upon ablation of said surface and which has a spectral line signature distinct from that of said ablating surface during ablation thereof; subjecting said surface to ablating conditions; and detecting radiation emanating from seed material ablated from said surface.

8. A method according to claim 7 wherein said surface is subjected to ablating conditions induced by moving a gas relative to said surface, the temperature and velocity of said gas being sufficient to ablate said surface.

9. A method according to claim 7 for detecting a transition between laminar and turbulent flow in the boundary layer adjacent said ablating surface comprising subjecting the surface to first ablating conditions, detecting radiation emanating from seed material ablated from said surface during said first ablating conditions, subjecting the surface to second, different ablating conditions, detecting radiation emanating from said seed material ablated from said surface during said second ablating conditions, and comparing the radiation detected under said first and second conditions to detect a change between laminar and turbulent flow in the boundary layer adjacent said ablating surface.

10. A method according to claim 7 wherein said radiation is detected by focussing said radiation, splitting said focussed radiation into its component frequencies, and detecting said component frequencies.

* * * * *